(12) United States Patent
Teichmann

(10) Patent No.: US 6,278,626 B1
(45) Date of Patent: Aug. 21, 2001

(54) ARCP MULTI-POINT CONVERTER HAVING VARIABLE-POTENTIAL INTERMEDIATE-CIRCUIT CAPACITANCES

(75) Inventor: Ralph Teichmann, Dresden (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 09/655,286

(22) Filed: Sep. 5, 2000

(30) Foreign Application Priority Data

Sep. 2, 1999 (DE) .............................................. 199 41 813

(51) Int. Cl.$^7$ .................................................. H02M 7/515
(52) U.S. Cl. .......................................................... 363/135
(58) Field of Search .............................. 363/57, 135, 138

(56) References Cited

U.S. PATENT DOCUMENTS 5,621,634 * 4/1997 Sato ........................................ 363/98
5,684,688 * 11/1997 Rovaud et al. ....................... 363/132

* cited by examiner

Primary Examiner—Shawn Riley
(74) Attorney, Agent, or Firm—Herbert L. Lerner; Laurence A. Greenberg; Werner H. Stemer

(57) ABSTRACT

An ARCP converter having a series circuit formed of at least four main switches per converter phase, which are connected electrically in parallel between DC voltage rails is described. A capacitance is connected in parallel with each individual main switch. Two intermediate-circuit capacitances are disposed between the DC voltage rails. A voltage neutral point of the capacitances is available for tapping. Junction points of adjacent main switches which do not form the output are connected to one another via variable-potential intermediate-circuit capacitances for forming commutation cells in a balanced manner with regard to the DC voltage rails. Each intermediate-circuit capacitance is formed of two capacitance elements, whose junction points are available as voltage neutral points, with the output of the converter phase connected to a resonant inductance, whose further connection is connected to all the voltage neutral points via a controllable bi-directional auxiliary switch.

3 Claims, 7 Drawing Sheets

ARCP MULTI-POINT CONVERTER HAVING VARIABLE-POTENTIAL INTERMEDIATE-CIRCUIT CAPACITANCES

BACKGROUND OF THE INVENTION

FIELD OF THE INVENTION

The invention relates to an auxiliary resonant commutated pole (ARCP) multi-point converter having variable potential intermediate-circuit capacitances and thus to circuits appertaining to power electronics, in particular soft-switching multipoint converter topologies for high-power converters.

Hard-switching multi-point converters having variable-potential intermediate-circuit capacitances, as have been proposed, for example, by T. Meynard et al. in International Patent Disclosure WO 93/02501, are used in the high-power field for controlling three-phase drives and, in power transmission systems, for gateways and compensation. The multi-point converter concept has been proven, in particular at high voltage levels for which the maximum reverse voltage of an individual active semiconductor device that is now available is inadequate. In contrast to the multi-point converter topologies with null or limiter diodes, as have been described, for example, by A. Nabae et al. in the reference titled "A New Neutral Point Clamped PWM Inverter", IEEE Transactions of Industry Applications, Vol-IA-17, No. 5, in the multi-point converter topology proposed by Meynard et al. the different output voltage levels on a converter path are obtained by skillful interconnection of differently charged intermediate circuit capacitances. The advantages of this topology become apparent in particular in multi-point converters having more than three points, in which the number and the required reverse voltage loading of the null or limiter diodes increase greatly in a topology in accordance with the reference by Nabae et al.

At present, GTO switches with inverse diodes are used in multi-point converters with a voltage intermediate circuit in the high power field. In this configuration, the maximum current gradients di/dt and the voltage gradients du/dt that occur have to be limited by passive limiter networks, in order to avoid destruction of the active semiconductor devices. Such networks are often highly lossy, and contribute significantly to converter complexity and converter costs. The maximum achievable switching frequency in these high-power converters is limited by the switching losses that occur in the semiconductor and by the minimum switching and recovery times of the semiconductor components. Since the switching frequency has a direct influence on the quality of the electrical input and output variables, and thus on the overall system configuration, the achievable switching frequency is a major quality criterion for a converter.

Progress in power-semiconductor development is now allowing converters to be operated with a considerably greater di/dt and du/dt, and this has resulted in the limiter networks becoming considerably smaller, or even being dispensed with. The present limit in the achievable switching frequency is thus now governed essentially only by the maximum permissible semiconductor losses.

Various soft-switching converter topologies that allow the switching losses to be significantly reduced have been proposed in order to increase the maximum switching frequency for converters in the low and medium power ranges. In particular, the "auxiliary resonant commutated pole" (ARCP) principle for two-point converters, proposed in U.S. Pat. No. 5,047,913 by R. De Doncker et. al, is highly suitable for reducing switching losses. In such an ARCP converter, a load relief capacitor is connected electrically in parallel with each main switch. Furthermore, an auxiliary circuit is provided, which contains an auxiliary switch that is electrically connected in series with a resonant inductance, and which connects a neutral point of a DC voltage intermediate-circuit capacitor to the output connection of the converter phase. All the main switches operate in the zero-voltage mode, while all the auxiliary switches operate in the zero-current mode.

In addition to the drastic reduction in switching losses, the ARCP principle also allows the maximum rate of current and voltage rise to be controlled by the choice of the resonant elements. Which, apart from the opportunity to use critical semiconductor switches or combinations of semiconductor switches (e.g. series circuit), also results in a reduction in the load on the insulation of the end turns in three-phase motors.

Approaches to extending the ARCP principle to three point converters with variable-potential capacitances have been shown by Dijkhuizen et al. at the IEEE IAS 98 Conference and by Deschamps et al. and by Yuan et al. at the Brazilian Power Electronics Conference COBEP 97. In these solutions, the converter output is connected to a resonant inductance, which is connected either to the positive or the negative DC voltage intermediate circuit rail (Deschamps) or via an additional transformer to the voltage neutral point of the DC voltage intermediate-circuit capacitor in the three point converter (Yuan). The essential disadvantage in the Deschamps configuration is that an asymmetric charge reversal operation takes place, that is to say the absolute value of the voltage across the resonant inductance at the beginning of the resonant charge reversal operation does not correspond to the absolute value of the voltage at the end of the resonant commutation. Additional lossy switching operations in the auxiliary path during the resonant commutation are necessary in order to achieve current decay in the auxiliary path. The essential disadvantage in the configuration according to Yuan is the high outlay on components. Particularly the production of the high frequency transformers in the auxiliary path, which are loaded by a high resonant current, is too complex and too expensive for broad application of this topology.

SUMMARY OF THE INVENTION

It is accordingly an object of the invention to provide an ARCP multi-point converter having variable-potential intermediate-circuit capacitance which overcomes the above-mentioned disadvantages of the prior art devices of this general type.

The invention is based on the object of specifying an ARCP multipoint converter having variable-potential capacitances which, on account of the configuration of fewer additional switching elements, allows a symmetrical resonant charge-reversal operation in order consequently to obtain a zero-current mode of the auxiliary switches and a zero-voltage mode of the main switches without lossy switching operations and without transformer-based transmitting units.

With the foregoing and other objects in view there is provided, in accordance with the invention, an auxiliary resonant commutated pole (ARCP) converter. The converter, contains converter phases, and each of the converter phases, includes a series circuit containing at least four main switches to be connected electrically in parallel between DC voltage rails including positive and negative DC voltage rails. Adjacent ones of the main switches define junction points there-between and one of the junction points functions as an output of a respective converter phase. Load-relief capacitances are provided, one of the load-relief capacitances is connected electrically in parallel with each of the main switches. Two intermediate-circuit capacitances of identical magnitude are to be disposed between the DC voltage rails, the two intermediate-circuit capacitances are connected to each other and define a connection point being a voltage neutral point. A variable-potential intermediate-circuit capacitance is connected to the junction points of the main switches which do not form the output and thus form commutation cells in a balanced manner with regard to the positive and negative DC voltage rails. The variable-potential intermediate-circuit capacitance has two capacitance elements with equivalent magnitudes and are connected to each other at a junction point defining a further voltage neutral point. A resonant inductance has a first connection connected to the output of the converter phase and a second connection. Independently controllable bi-directional auxiliary switches are connected to the voltage neutral point and the second connection of the resonant inductance.

The object is achieved according to the invention, in accordance with a second embodiment of the auxiliary resonant commutated pole (ARCP) multipoint converter. The converter contains converter phases, each of the converter phases includes a series circuit containing more than four main switches to be connected electrically in parallel between DC voltage rails including a positive and negative DC voltage rail. Adjacent ones of the main switches define junction points there-between and one of the junction points functions as an output of a respective converter phase. Load relief capacitances are provided, one of the load-relief capacitances is connected electrically in parallel with each of the main switches. Two intermediate-circuit capacitances of identical magnitude are to be disposed between the DC voltage rails. The two intermediate-circuit capacitances are connected to each other defining a connection point being a voltage neutral point. Variable-potential intermediate-circuit capacitances are connected to the junction points of the main switches which do not form the output of the converter phase and thus forming commutation cells in a balanced manner with regard to the positive and negative DC voltage rails. Each of the variable-potential intermediate-circuit capacitance have two capacitance elements with equivalent magnitudes and are connected to each other at a junction point defining a further voltage neutral point. Independently controllable bi-directional auxiliary switches are provided. One of the independently controllable bi-directional auxiliary switches is connected to the voltage neutral point of the variable-potential intermediate-circuit capacitances and another of the independently controllable bi-directional auxiliary switches is connected to the further voltage neutral point of each of the variable-potential intermediate-circuit capacitances. Resonant inductances are provided. One of the resonant inductances is connected between the output of the converter phase and one of the independently controllable bi-directional auxiliary switches. Another of the resonant inductances is connected between each neighboring pair of the independently controllable bi-directional auxiliary switches such that the further voltage neutral point of respectively adjacent commutation cells are connected to one another via the independently controllable bi-directional auxiliary switches and the resonant inductances.

The object is achieved according to the invention, in accordance with a third embodiment of the auxiliary resonant commutated pole (ARCP) converter. The converter includes converter phases and each of the converter phases, includes a series circuit containing at least four main switches to be connected electrically in parallel between DC voltage rails including positive and negative DC voltage rails. Adjacent ones of the main switches define junction points there-between and one of the junction points functions as an output of a respective converter phase. Load-relief capacitances are provided, one of the load-relief capacitances is connected electrically in parallel with each of the main switches. At least three intermediate-circuit capacitances are to be disposed between the DC voltage rails and connected to each other in series defining voltage taps there-between at each connection. The intermediate-circuit capacitances have capacitance values such that the voltage taps have voltage levels in a middle of voltage levels to be set at the output of the converter phase. Variable-potential intermediate-circuit capacitances are connected to the junction points of the main switches which do not form the output of the converter phase thus forming commutation cells in a balanced manner with regard to the positive and negative DC voltage rails. Independently controllable bi-directional auxiliary switches are connected to the voltage taps. A resonant inductance having a first terminal is connected to the output of the converter phase and a second terminal connected to the independently controllable bi-directional auxiliary switches.

The configuration for a polyphase multi-point converter having variable-potential intermediate-circuit capacitances is obtained by the configuration of a plurality of converter phases that are each connected electrically in parallel with a DC voltage intermediate circuit backed up by a capacitor. Each of the phases have in each case $2(n-1)$ series-connected active main switches (n=number of converter points or number of possible output voltage levels), which connect the positive to the negative connection of the DC voltage intermediate-circuit capacitance. An output connection for a respective converter phase is provided at a junction point between the $(n-1)$th and the n-th main switch. Each converter phase has $(n-2)$ variable-potential intermediate-circuit capacitances whose positive connection points, in the chain of series-connected main switches, are connected to the junction point between the switches $(n-1-k)$ and $(n-2-k)$ and whose negative connection points are connected to the junction point between the main switches $(n+k)$ and $(n+1+k)$ where $k=0 \ldots (n-3)$.

Based on this hard-switching multi-point converter topology having the variable-potential intermediate-circuit capacitances, the desired soft-switching ARCP multipoint converter topology is achieved by the below listed modifications and extensions.

a). For each converter phase, a series circuit formed of two capacitances or alternative voltage sources has to be provided in order to ensure that a voltage neutral point is available for that converter level. In the case of the multipoint converter having the variable-potential intermediate-circuit capacitances, this is done by appropriate division of the main capacitance in the DC voltage intermediate circuit or of the variable-potential intermediate-circuit capacitances.

b). The output of the converter phase must be connected through a series circuit formed of a resonant inductance and an independently controllable bidirectional auxiliary switch to the voltage neutral point of the innermost variable-potential intermediate-circuit capacitance. The voltage neutral points of all the variable-potential intermediate-circuit capacitances must be connected through a series circuit containing a resonant inductance and an independently controllable bi-directional auxiliary switch to the neutral point of the variable-potential intermediate-circuit capacitance that is nearest above the intermediate-circuit voltage, or to the voltage neutral point of the DC voltage intermediate-circuit capacitance. If no voltage neutral points are provided at the variable-potential intermediate-circuit capacitances, the bi-directional auxiliary switches connected to the resonant inductance are coupled at the voltage taps of the divided DC voltage intermediate-circuit capacitance.

c). A load-relief capacitance must be fitted in parallel with each main switch.

A low-loss ARCP multipoint converter is thus advantageously obtained which combines the advantages of a multipoint converter having the variable-potential intermediate-circuit capacitances with those of an ARCP converter and in which it is possible to achieve maximum switching load relief. With this topology, the switching instant of the main switches for the converter phase can be selected freely, as a result of which it is possible to use conventional pulse-width modulation methods. The main switches in this ARCP converter phase switch on and off when the voltage across these components disappears (zero voltage switching (ZVS) principle). The auxiliary switches in series with the resonant inductance are likewise operated using the zero current switching (ZCS) principle in order to relieve switching loads. In the ZCS principle, the auxiliary switch is switched on and off when the current disappears. Therefore, all the semiconductor switches used in this converter phase switch with low losses. The voltage aspects of the configuration of the main switches and auxiliary switches, as well as the method of operation of the switches, can be seen in Table 1, below. The configuration of the rated current aspects of the switches depends on the circuit parameters which determine the root-mean square current through the switch, and the thermal and electrical characteristics of the switches. The advantages of the ARCP multi-point converter topology having the variable-potential intermediate-circuit capacitances over the previously proposed ARCP three-point converters are now described.

a). Symmetrical ringing operation which does not require a transformer-based transmitting unit or boost phases for a purpose other than to compensate for resistive losses in order to enable soft switching of all the installed switches.

b). Reverse voltage loading on all the auxiliary switches in the preferred configuration (FIGS. 1 and 2) is only $V_{dc}/2/(n-1)$.

c). Scalability of the topology to any desired number of converter points.

TABLE 1

Switch Configuration

| | Type | Required Reverse voltage |
|---|---|---|
| Main switches ($S_x$; $x = 1 \ldots 2(n-1)$) | ZVS | $V_{dc}/(n-1)$ |
| Auxiliary switches ($S_{aux\_y}$; $y = 1 \ldots (n-1)$) | ZCS | $V_{dc}/2/(n-1)$: constant for arrangements according to FIGS. 1, 2 $V_{dc}/2/(n-1) \ldots \frac{2(n-1)-1}{2(n-1)} V_{dc}$: variable for arrangements according to FIGS. 9, 10, 11 |

Other features which are considered as characteristic for the invention are set forth in the appended claims.

Although the invention is illustrated and described herein as embodied in an ARCP multi-point converter having variable-potential intermediate-circuit capacitances, it is nevertheless not intended to be limited to the details shown, since various modifications and structural changes may be made therein without departing from the spirit of the invention and within the scope apd range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
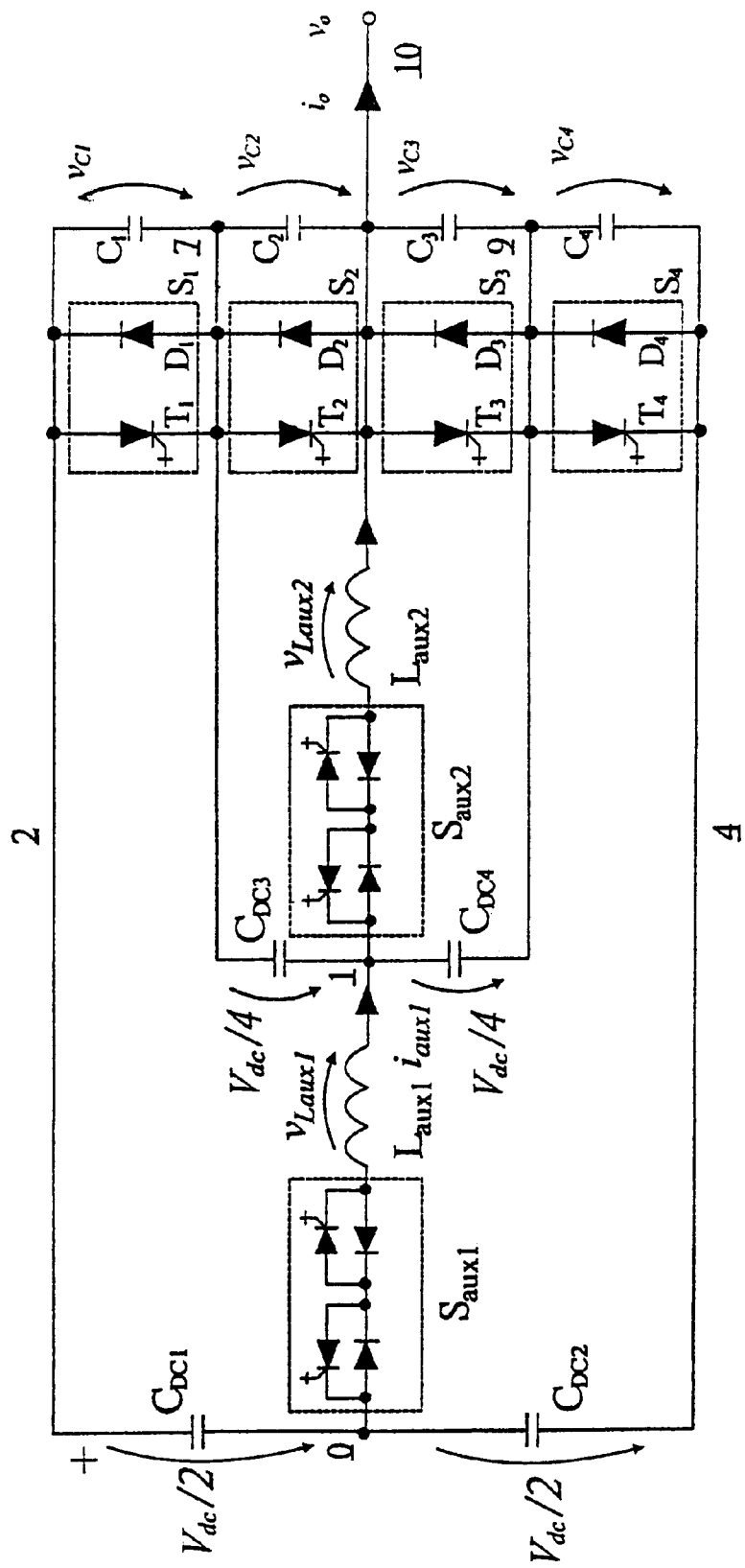
FIG. 1 is a circuit diagram of an output phase of an ARCP three-point converter having variable-potential intermediate-circuit capacitances according to the invention.

In all the figures of the drawing, sub-features and integral parts that correspond to one another bear the same reference symbol in each case. Referring now to the figures of the drawing in detail and first, particularly, to FIG. 1 thereof, there is shown a configuration of one output phase of a three-point converter. The one phase contains a series circuit of main switches S1 to S4 which are connected electrically in parallel with a DC voltage intermediate circuit. The DC voltage intermediate circuit contains a series circuit of capacitances $C_{DC1}$ and $C_{DC2}$ of the same magnitude, and thus connects a positive DC voltage rail 2 to a negative DC voltage rail 4.

Load-relief capacitances C1 to C4 are connected directly in parallel with each main switch S1 to S4. The switches S1 to S4 each contain a power semiconductor T1 . . . T4, generally T, which can be switched off actively, with a back-to-back connected diode D1 . . . D4, generally D (inverse diode). A variable-potential intermediate-circuit capacitance, containing capacitance elements $C_{DC3}$ to $C_{DC4}$, is connected to junction points 7 and 9 of the main switches S1 and S2 and of the main switches S3 and S4, respectively.

Voltage neutral points 0 and 1 of the DC voltage intermediate-circuit capacitor and of the variable-potential intermediate-circuit capacitance, respectively, and also an output 10 of the converter phase are each connected by a series circuit containing a resonant inductance Laux and an auxiliary switch Saux. The auxiliary switches Saux contains a series circuit having two power semiconductors, which can be switched off actively, with back-to-back connected diodes which are connected to one another so as to produce a bi-directional switch.

Figure 2:
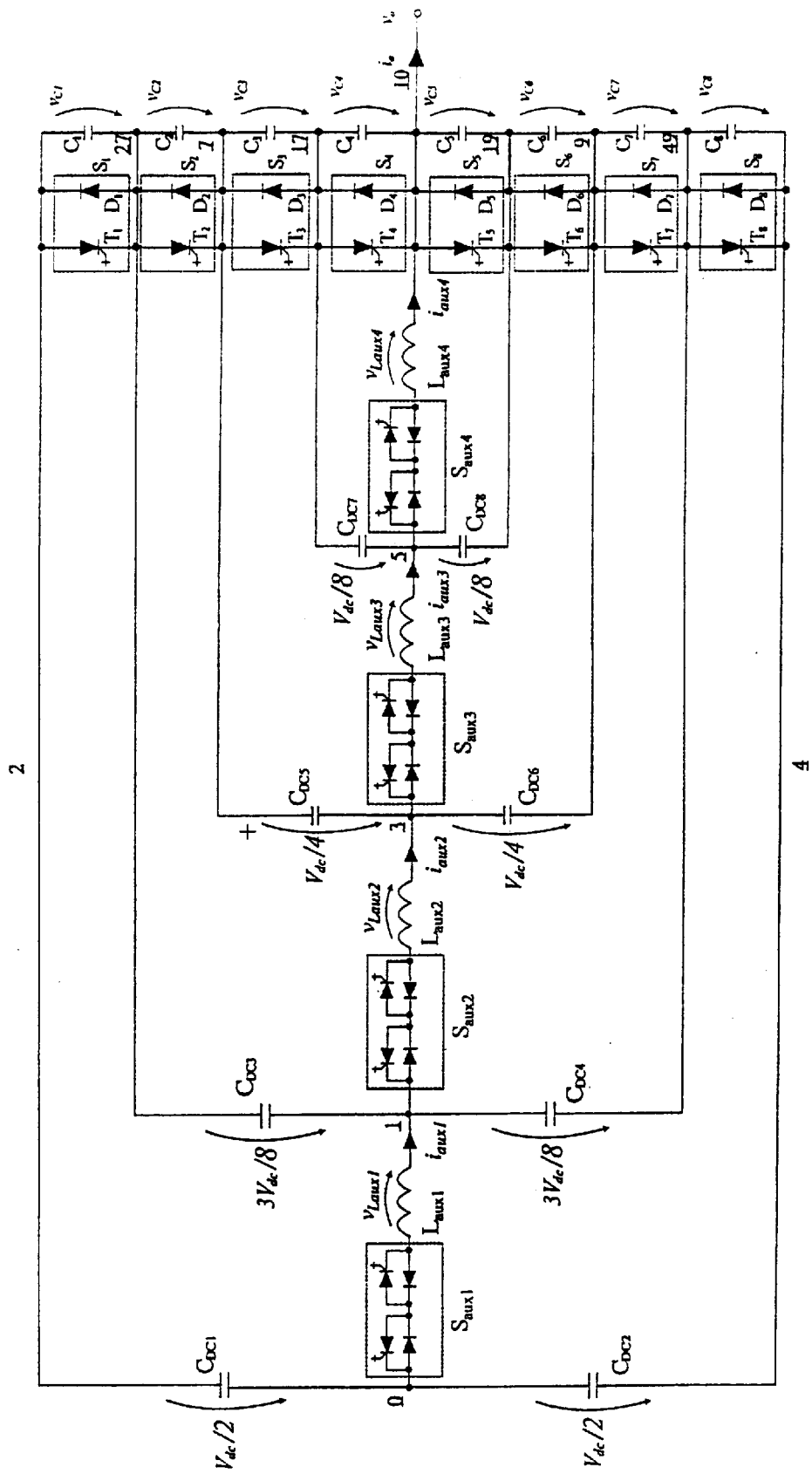
FIG. 2 is a circuit diagram of one phase of an ARCP five-point converter having the variable-potential intermediate-circuit capacitances, which converter has been configured using the above-stated guidelines.

FIG. 2 shows an extension of the embodiment in FIG. 1 to an ARCP five-point converter. An output phase of the five-point converter contains a series circuit formed of the main switches S1 to S8, which are connected electrically in parallel with the DC voltage intermediate circuit. The DC voltage intermediate circuit is formed a series circuit of two capacitances $C_{DC1}$ to $C_{DC2}$ of the same magnitude, and thus connects the positive DC voltage rail 2 to the negative DC voltage rail 4. The switches S1 to S8 are each formed of a power semiconductor T, which can be switched off actively, and a back-to-back connected diode D. Junction points 27 and 49 of the main switches S1 and S2 and of the main switches S7 and S8, respectively, are connected to a variable-potential capacitance formed from the capacitance elements $C_{DC3}$ and $C_{DC4}$.

The junction points 7 and 9 of the main switches S2 and S3 and of the main switches S6 and S7, respectively, are connected to a variable-potential capacitance formed from the capacitance elements $C_{DC5}$ and $C_{DC6}$. Furthermore, the junction points 17 and 19 of the main switches S3 and S4 and of the main switches S5 and S6, respectively, are connected to a variable-potential capacitance formed from the capacitance elements $C_{DC7}$ and $C_{DC8}$.

The load-relief capacitances C1 to C8 are connected directly in parallel with the main switches S1 to S8. In addition, the voltage neutral points 0, 1, 3 and 5 at the variable-potential intermediate-circuit capacitances and also the output of the converter phase are each connected via a series circuit containing a bi-directional auxiliary switch and a resonant inductance Laux. The auxiliary switches contain a series circuit formed of two power semiconductors, which can be switched off actively, with back-to-back connected diodes which are connected to one another so as to produce a bi-directional switch.

Figure 3:
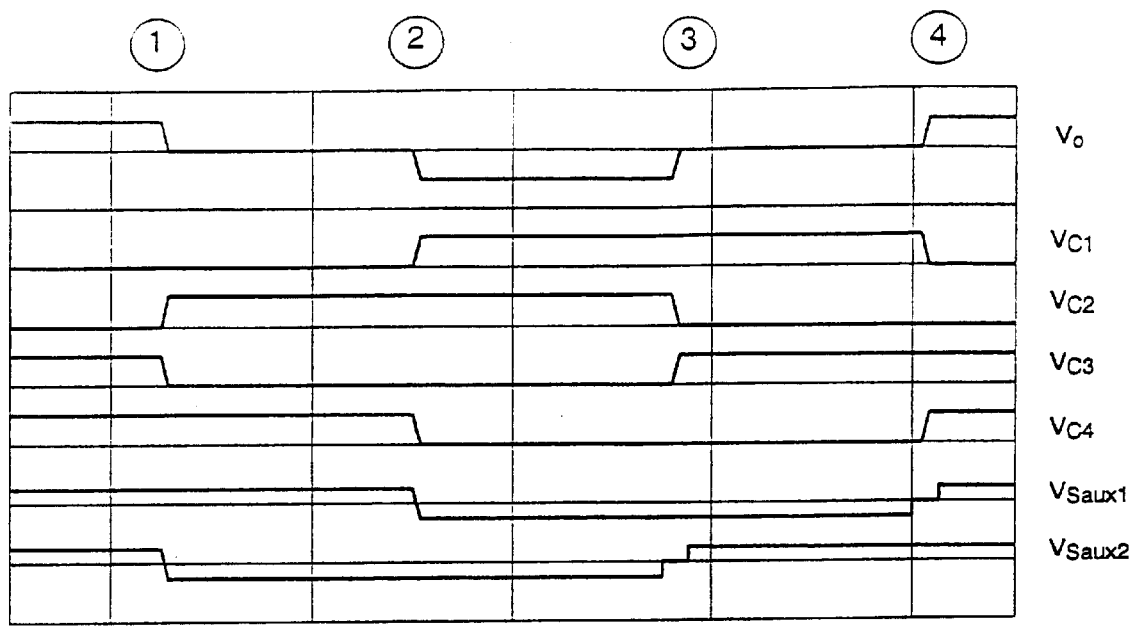
FIG. 3 is a diagram showing qualitatively, a profile of the voltage across load-relief capacitances C1 to C4, a voltage cross auxiliary switches Saux1 and Saux2, as well as an output voltage Vo for the ARCP three-point converter having the variable-potential intermediate-circuit capacitances and a positive output current $i_o$.

FIG. 3 shows voltages $V_{C1}$ to $V_{C4}$ across the load-relief capacitances, and thus the voltages across the main switches S1 to S4, the converter output voltage $V_o$. and the voltage across the auxiliary switches Saux1 and Saux2 for the ARCP three-point converter having the variable-potential intermediate-circuit capacitances in accordance with FIG. 1.

Assuming a positive load current $i_o$, a full switching sequence is shown, from the maximum positive output voltage $V_o$, via the maximum negative output voltage $V_o$, and back. The first two commutation operations are capacitive commutation operations. The output voltage $V_o$. is changed back to the maximum positive output voltage once again by the two ARCP commutation operations. The subdivision scale of the ordinate corresponds to the magnitude of the DC voltage Vdc in the DC voltage intermediate circuit. The commutation times are heavily dependent on the chosen circuit parameters. All the profiles are described in detail in the following text.

Figure 4:
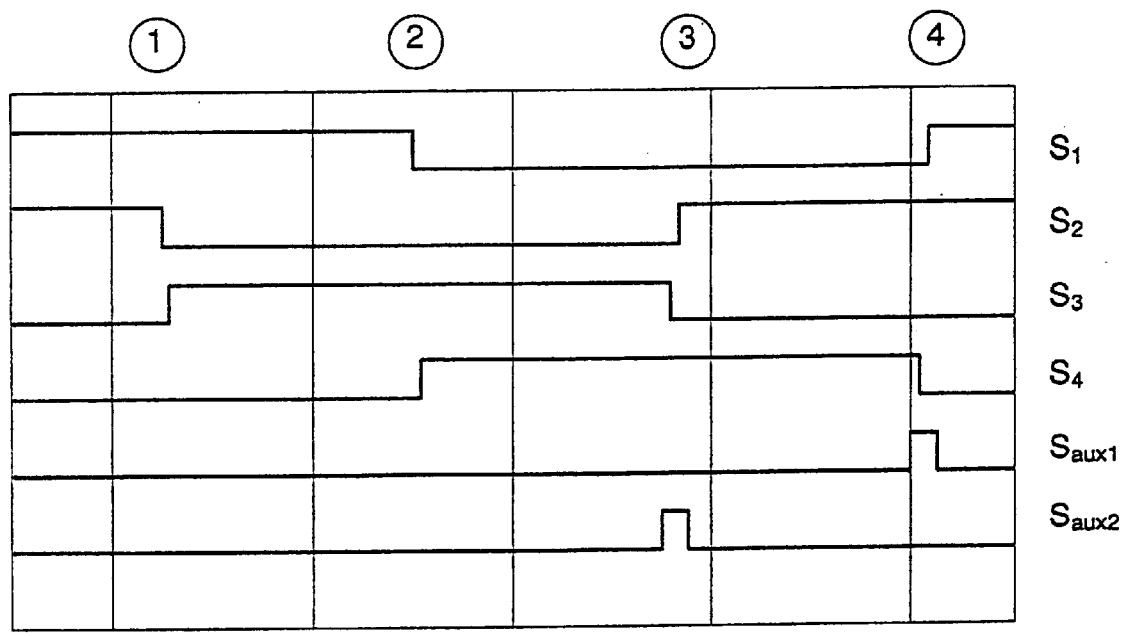
FIG. 4 is a diagram showing switching states for the controllable switches within a switching sequence for the ARCP three-point converter having the variable-potential intermediate-circuit capacitances and the positive output current $i_o$.

FIG. 4 shows the logic states of all the switches in one converter phase of the ARCP three-point converter having the variable-potential intermediate-circuit capacitances, corresponding to the commutation operations illustrated in FIG. 3. The auxiliary switches are switched on only during the commutation operations, and do not affect steady-state operation of the converter.

Figure 5:
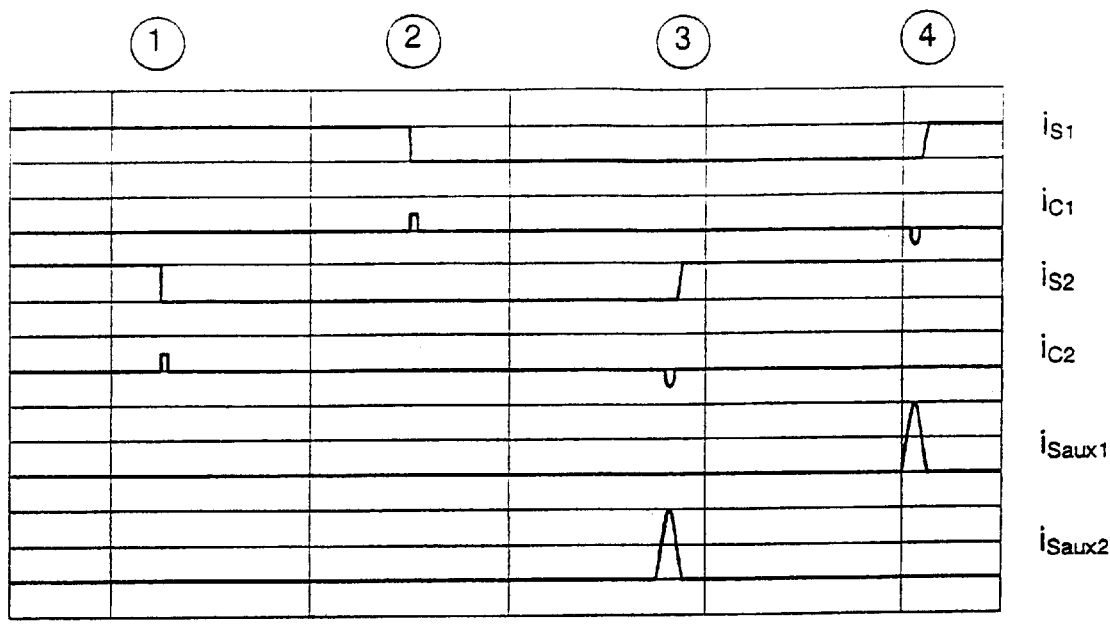
FIG. 5 is a diagram showing, qualitatively, a profile of the currents through the auxiliary switches Saux1 and Saux2, through the main switches S1 and S2 and also through the load-relief capacitances C1 and C2 for an ARCP three-point converter.

FIG. 5 shows, qualitatively, the current profiles through the auxiliary switches Saux1 and Saux2. The currents in the main switches S1 and S2 and in the load relief capacitances C1 and C2 are also shown. The level of the resonant current can be influenced by the choice of the resonant elements and by the level of the boost current. One ordinate subdivision corresponds to the magnitude of the output current $i_o$. The commutation sequence corresponds to the descriptions for FIG. 3 and FIG. 4.

Figure 6:
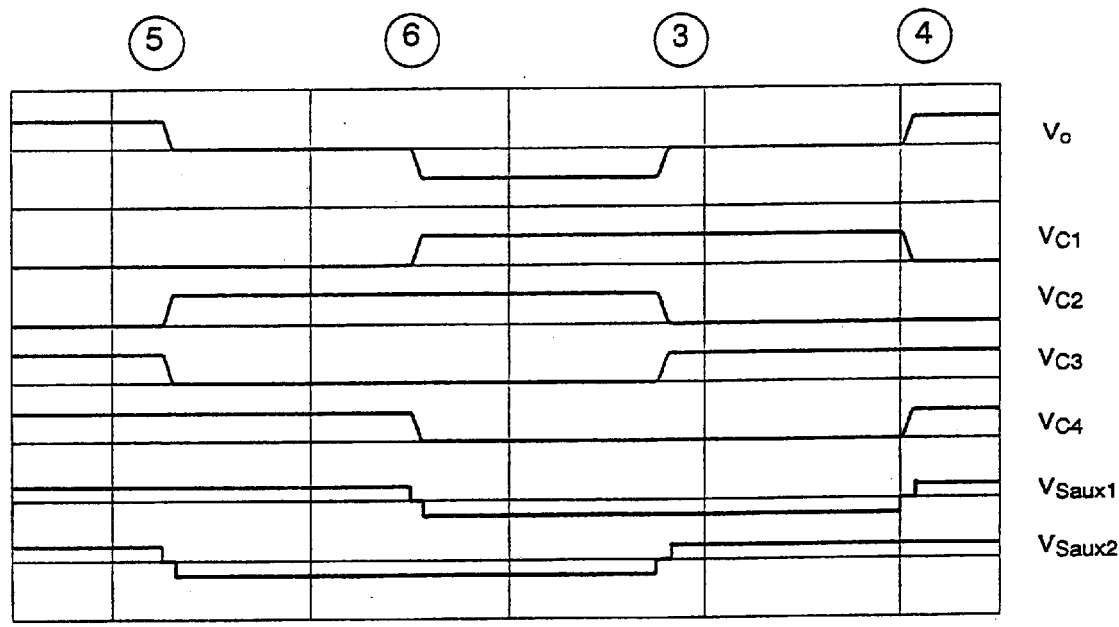
FIGS. 6–8 are diagrams showing relationships in accordance with FIGS. 3–5, but for ARCP-assisted capacitive commutations for the ARCP three-point converter having the variable-potential intermediate-circuit capacitances.

FIG. 6 corresponds to FIG. 3, but shows, qualitatively, the profile of the voltage across the load-relief capacitances and the variable-potential intermediate-circuit capacitances for a switching sequence with ARCP-assisted capacitive commutation for the ARCP three-point converter having the variable-potential intermediate-circuit capacitances. The ordinate subdivision corresponds to the subdivision in FIG. 3. The first two commutation operations are in this case ARCP-assisted capacitive commutation operations. The charges on the capacitors are not reversed linearly as in FIG. 3, but with the aid of a resonant oscillation. The two subsequent ARCP commutation operations correspond qualitatively to the ARCP commutation operations in FIG. 3. Both the commutation times and the level of the resonant current for the ARCP-assisted capacitive commutation operations are heavily dependent on the chosen circuit parameters.

Figure 7:
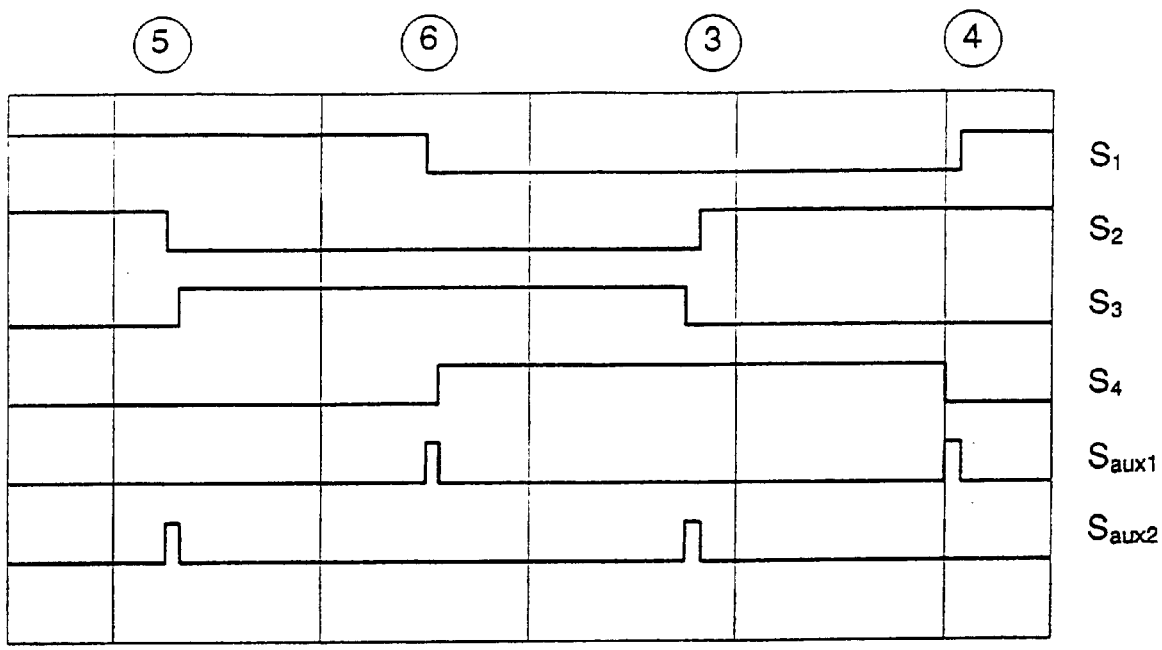

FIG. 7 corresponds to FIG. 4, and shows the drive logic for all the switches for the commutation operations discussed for FIG. 6. Once again, the auxiliary switches Saux1 and Saux2 are activated only for the commutation operations.

Figure 8:
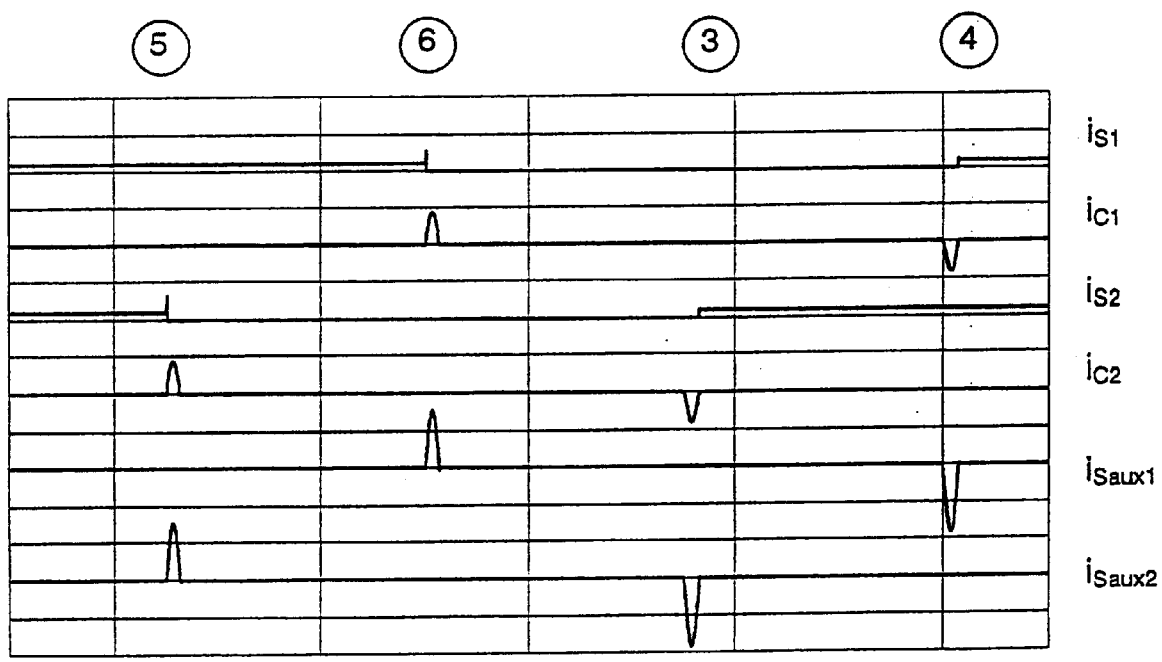

FIG. 8 shows, qualitatively, the profile of the currents introduced in FIG. 5, for the commutation operations discussed for FIG. 6. The ordinate scale in this illustration corresponds to 50% of that in FIG. 5, and the load current $i_o$ corresponds to only 10% of the load current in the illustration shown in FIG. 5. The desired excessive current increases in the main switches at the beginning of the ARCP-assisted capacitive commutation are clearly visible. All the current profiles illustrated are described in the following text.

Figure 9:
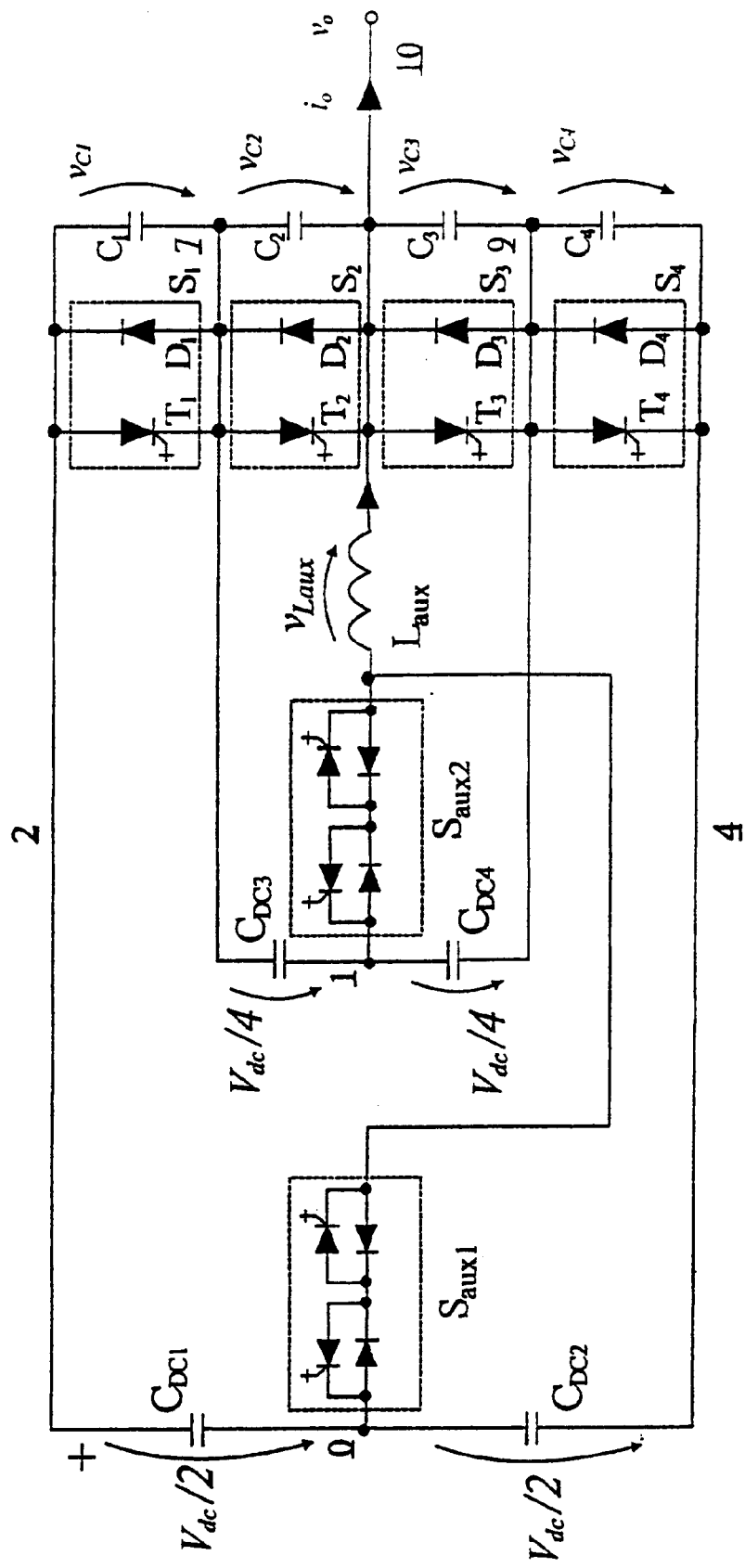
FIGS. 9–11 are circuit diagrams of alternative embodiments of an ARCP converter phase having the variable-potential intermediate-circuit capacitances.

FIG. 9 shows an alternative embodiment of the ARCP converter phase having the variable-potential intermediate-circuit capacitances. By comparison with the embodiment in FIG. 1, only one resonant inductance Laux is provided. The latter is coupled to the converter output and is connected electrically in series in each case with a bi-directional auxiliary switch Saux1 and Saux2, which, for their part, are coupled to the neutral points of the variable-potential capacitances and to the neutral point 0 of the DC voltage intermediate-circuit capacitance, respectively. The reverse-voltage load for the bi-directional auxiliary switches in one converter phase is thus not identical. The maximum load occurs on the bi-directional auxiliary switch with connection point 0 and is Vdc/2. This embodiment can be extended to ARCP multipoint converters having more than 3 points by adding further auxiliary switches which connect the neutral points of further variable-potential intermediate-circuit capacitances to the resonant inductance.

Figure 10:
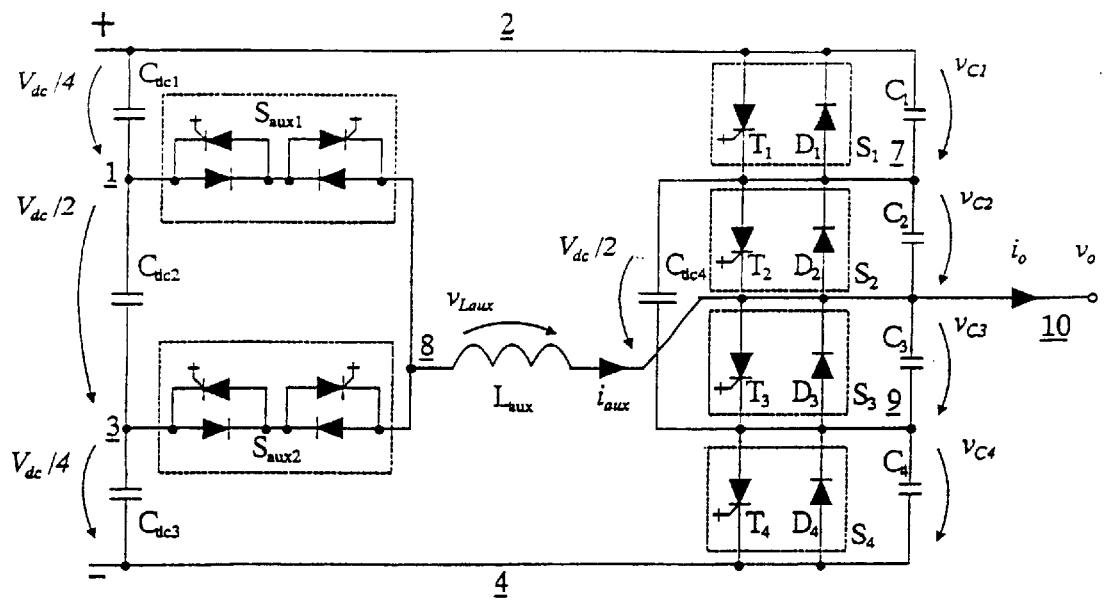

FIG. 10 uses the example of the ARCP three-point converter phase to show a further alternative embodiment of an ARCP converter phase having the variable-potential intermediate-circuit capacitances. By comparison with the previous embodiments shown, the variable-potential capacitances are not divided into capacitance elements. Instead, the capacitance in the DC voltage intermediate circuit is subdivided into at least n capacitance elements, to whose junction points (n–1) the bi-directional auxiliary switches are connected. The second connection of the bi-directional auxiliary switches is jointly connected to a resonant inductance Laux connected to the converter output. This topology is distinguished by a maximum reverse-voltage load across the auxiliary switches of ¾ Vdc.

Figure 11:
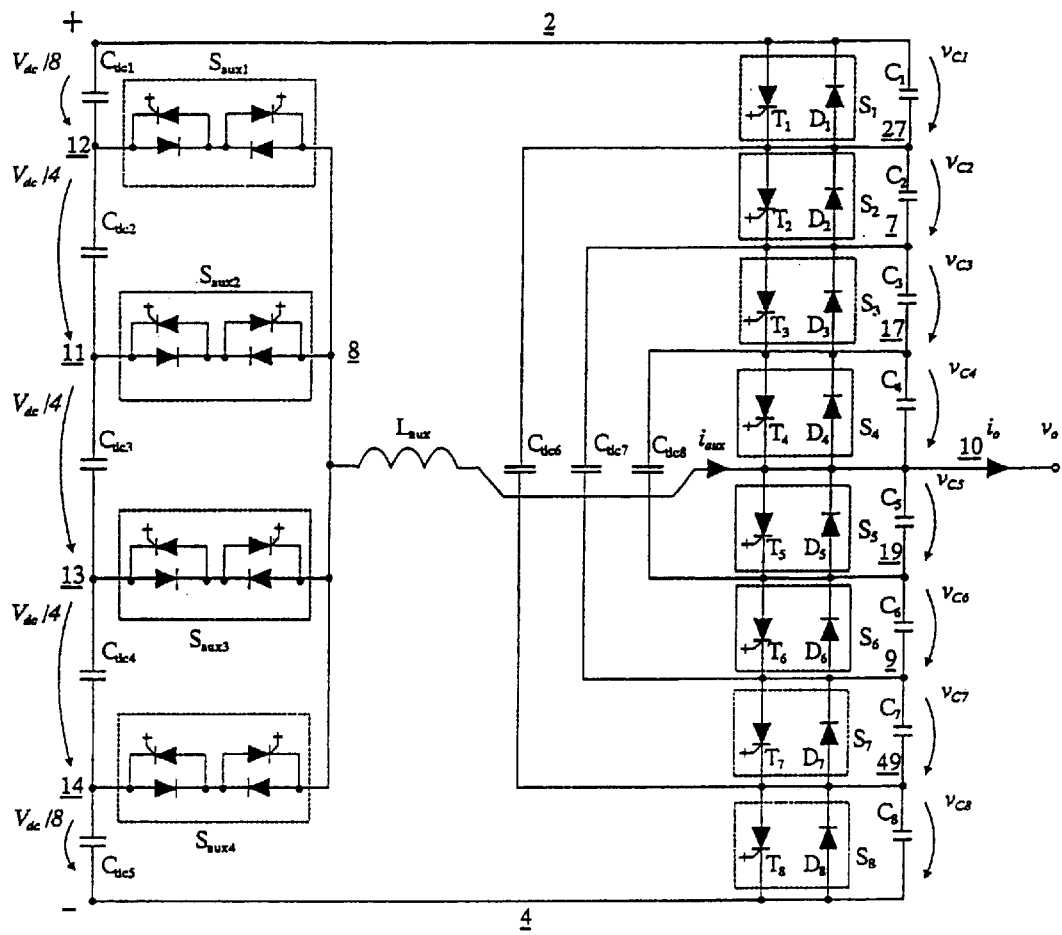

FIG. 11 shows an extension of the configuration in FIG. 10 to an ARCP five-point converter having the variable-potential intermediate-circuit capacitances for illustrating the necessary ratios of the voltage elements across the capacitance elements in the DC voltage intermediate circuit. In the configuration of the capacitors in the DC voltage intermediate circuit, it is necessary to provide for this topology (n−1) voltage taps which, with respect to the converter neutral point 0, have voltages corresponding to the arithmetic mean of the output voltages $V_o$ occurring before and after the commutation operations. The maximum reverse-voltage load that occurs at the auxiliary switches Saux1 and Saux4 and is ⅞ Vdc.

The following text will now describe the method of operation of the converter phase as shown in FIG. 1 of the low-loss ARCP multipoint converter—according to the invention—having the variable-potential intermediate circuit capacitances, based on the commutation processes from the upper main switches S1 and S2 to the lower main switches S3 and S4, and back. These explanations can be applied mutatis mutandis to multi-point converters with more than three points. The operation of the three-point converter having the variable potential intermediate-circuit capacitances is governed by the switching states shown in Table 2, below, in order to achieve the desired output voltages $V_o$ with respect to the converter neutral point 0 (see column 2). There are two alternative switching states that generate an output voltage of zero. The transitions p→$0_+$ →n→0→p are described below.

TABLE 2

Switching states for a three-point converter having the variable-potential intermediate-circuit capacitances

| Identification | output voltage | $S_1$ | $S_2$ | $S_3$ | $S_4$ |
|---|---|---|---|---|---|
| p | +$V_{dc}$/2 | 1 | 1 | 0 | 0 |
| $0_+$ | 0 | 1 | 0 | 1 | 0 |
| $0_-$ | 0 | 0 | 1 | 0 | 1 |
| n | −$V_{dc}$/2 | 0 | 0 | 1 | 1 |

The following text provides a detailed description of the individual switching transitions for a positive output current $i_o$. The commutation operations p→0 and 0→n are in this case capacitive commutation operations and, respectively, ARCP-assisted capacitive commutation operations, and the commutation operations n→0 and 0→p are ARCP commutation operations. If the output current is relatively low, the load-relief capacitances are relatively large, and the DC voltage is relatively high, it is possible for undesirably long commutation times to occur for capacitive commutation. In order to shorten the commutation duration for capacitive commutation, the ARCP auxiliary path can be used to accelerate the commutation process, leading to an ARCP assisted capacitive commutation process.

The following text relates to a commutation operation p→0 where $i_o$>$0_+$.

a) Capacitive commutation (see figure mark 1 in FIGS. 3–5): Before the start of the commutation operation, the switches S1 and S2 are closed. The output current $i_o$ flows through the switches T1 and T2. The respective voltages across the switches S3 and S4 are $V_{C3}$=$V_{C4}$=Vdc/2. The inverse diodes D3 and D4 are thus reverse-biased. The commutation operation starts when the switch T2 is switched off actively. The load current $i_o$ commutates equally into the load-relief capacitances C2 and C3, whose charges are reversed. In the process, the voltage across C3 falls linearly while it rises linearly across C2. The entire load current is passed via the positive DC voltage rail, since that half of the load current which flows through C3 is also passed back to the positive DC voltage rail again via the variable-potential intermediate-circuit capacitance. The voltage across the capacitor C4 remains at $V_{C4}$=Vdc/2 owing to the switch T1 being switched on and owing to the relatively constant voltage across the variable-potential intermediate-circuit capacitor, formed of $C_{DC3}$ and $C_{DC4}$.

The main switch commutation process ends when the voltage across the capacitor C3 has reached the value $V_{C3}$=0 and the switch S3 together with the diode D3 switch on when the ZVS condition is satisfied. This is the end of the commutation process, and the "$0_+$" state has been reached. The switches S2 and S3 are switched on, and the voltages $V_{C2}$ and $V_{C4}$ are both Vdc/2. The auxiliary switches Saux1 and Saux2 are not activated for this commutation operation.

b) ARCP-assisted capacitive commutation (see figure mark 5 in FIGS. 6–8).

The switches S1 and S2 are closed before the start of the commutation operation. The load current $i_o$ flows through the witches T1 and T2. The voltage across each of the switches S3 and S4 is $V_{C3}$=Vdc/2. The inverse diodes D3 and D4 are reverse-biased. The commutation process is started when Saux2 is switched on, when iaux2=0 (ZCS). Since the voltage VLaux2=−Vdc/4 across the inductance Laux2 is now negative, a negative current rise iaux2 occurs in the auxiliary path. When the current in T1 and T2 (which contains the superimposition of the load current $i_o$ and the current iaux2) reaches a specific value, which can be chosen freely, the main switch commutation process is started by switching T2 off actively. The current level at which the switching-off process takes place is chosen so that the commutation duration is within the maximum desired commutation duration. Once T2 has been switched off, the charge-reversal current (containing a superimposition of the load current $i_o$ and the current iaux2) commutates into the capacitors C2 and C3 and reverses their charges. In this case, the capacitor C2 is charged non-linearly, while the capacitor C3 is discharged in a corresponding manner. Both halves of the load current are passed via the positive DC voltage rail 2, while the resonant component flows only through the variable-potential capacitances $C_{DC3}$ and $C_{DC4}$. The voltage across the capacitance C4 is in this case kept at $V_{C4}$=Vdc/2 by virtue of the closed switch S1 and the relatively constant voltage across the variable-potential capacitances $V_{DC3}$ and $C_{DC4}$.

The main switch commutation process ends when the voltage across C3 has reached the value $V_{C3}$=0 and the switch S3 is switched on in ZVS conditions. There is now a positive voltage of VLaux2=Vdc/4 across the inductance Laux2 in the auxiliary path, leading to a positive current gradient in iaux2. When the current iaux2 has reached the value iaux2=0, the switch Saux2 can be switched off in ZCS conditions. This is the end of the entire commutation process, and the converter path has reached the "$0_+$" state.

The following text now deals with a commutation operation $0_+$→n where $i_o$>0.

a) Capacitive commutation (see figure mark 2, FIGS. 3–5).

The switches S1 and S3 are closed before the start of the commutation operation. The load current $i_o$ flows through T1 and the inverse diode D3. The voltage across the respective switches S2 and S4 is $V_{C2}$=$V_{C4}$=Vdc/2. The inverse diodes D2 and D4 are thus reverse-biased. The commutation process is initiated by the switch T1 being switched off actively. The load current $i_o$ commutates equally into the capacitors C1 and C4, with the charges of the latter being reversed. In the process, the voltage across the capacitor C1 rises linearly, while the voltage across the capacitor C4 falls linearly. Reversal of the charge on the capacitor C2 is prevented, as required, by the variable-potential intermediate-circuit capacitance, formed of $C_{DC3}$ and $C_{DC4}$, and the closed switch S3, which keeps the voltage across the switches S2 and S3 constant at $V_{C2}$=Vdc/2 and $V_{C3}$=0.

The commutation process ends when the voltage across C4 has reached the value $V_{C4}=0$ and the switch S4 is switched on in ZVS conditions. The load current $i_o$, half of which was in each case carried by the positive DC voltage rail 2 and half by the negative DC voltage rail 4 during the commutation operation, now commutates completely onto the inverse diodes D3 and D4. The commutation operation thus ends, and the "n" state has been reached, with an output voltage of $V_o=-Vdc/2$. The auxiliary switches Saux1 and Saux2 are not activated for this commutation operation.

b) ARCP-assisted capacitive commutation (see figure mark 6, FIGS. 5–8).

The switches S1 and S3 are closed before the start of the commutation process. The load current $i_o$ flows through T1 and the inverse diode D3. The voltage across the respective switches S2 and S4 is $V_{C1}=V_{C4}=Vdc/2$. The inverse diodes D2 and D4 are thus reverse-biased. The commutation process starts when the auxiliary switch Saux1 is switched on when iaux1=0 (ZCS). Since, as a result of this, the voltage VLaux1=−Vdc/4 across the inductance Laux1 is negative, there is a negative current rise iaux1 in the auxiliary path. When the current in T1 (containing the superimposition of $i_0$ and iaux1) reaches a specific value, which can be chosen freely, the main switch commutation operation is started by switching T1 off actively. The current level at which it is switched off is chosen such that the commutation duration is within the desired maximum commutation duration.

Since the main switch S3 remains switched on and the voltage across the variable-potential intermediate-circuit capacitance is relatively constant, the load current io with the superimposed current iaux1 commutates, once T1 has been switched off, into the capacitors C1 and C4 and reverses the charges of the latter. In the process, the voltage across the capacitor C1 rises non-linearly, while the voltage across the capacitor C4 falls in a corresponding manner. The voltages across the capacitors C2 and C3 each remain constant at $V_{C2}=Vdc/2$ and $V_{C3}=0$ (see FIG. 6).

The main switch commutation operation ends when the voltage across the capacitor C4 has reached the value $V_{C4}=0$ and the switch S4 has been switched on in ZVS conditions. The charge-reversal current, formed of the load current $i_o$ and the current iaux1, now commutates from the positive DC voltage rail, which carried half this charge-reversal current during the commutation operation, completely to the inverse diodes in S3 and S4. A positive voltage of VLaux1=Vdc/4 is now present across the inductance Laux1 in the auxiliary path, leading to a positive current gradient in iaux1. When the current iaux1 has reached the value iaux1=0, the switch Saux1 can be switched off in ZCS conditions. This ends the entire commutation operation, and the converter path has reached the "n" state.

The following text deals with the commutation operation n→0–where $i_0>0$.

ARCP commutation (see figure mark 3, FIGS. 3–5):

The switches S3 and S4 are switched on before the start of the commutation operation. The load current $i_o$ flows through the inverse diodes D3 and D4. The voltage across the respective switches S1 and S2 is $V_{C1}=V_{C2}=Vdc/2$. The inverse diodes D1 and D2 are thus reverse-biased. The commutation operation is started when the auxiliary switch Saux2 is switched on when iaux2=0 (ZCS). Since the voltage across the inductance Laux2 is positive, VLaux2=Vdc/4, a positive current rise $i_{aux2}$ occurs in the auxiliary path. When the current iaux2 reaches a specific value Iboost>0 where Iboost=iaux2−$i_o$, the commutation operation is started by the power semiconductor T3 being switched off actively. This value of the boost current Iboost can be chosen freely, but has to have a minimum value which guarantees that the voltage across the capacitor C2 changes over completely to the value $V_{C2}=0$ even with a lossy, nonideal configuration. The difference between the load current $i_o$ and the auxiliary current iaux2 commutates into the capacitors C2 and C3, which results in the capacitor C2 being discharged and the capacitor C3 being charged. While the load current, via Saux2, $C_{DC4}$ and S4, is carried completely by the negative DC voltage rail 4, the resonant current flows only through the variablepotential capacitances $C_{DC3}$ and $C_{DC4}$, the auxiliary path Saux2/Laux2 and the load-relief capacitances via the switches S2 and S3. Since the voltage across the series circuit of $C_{DC3}$ and $C_{DC4}$ is relatively constant and the switch S4 remains closed, the voltage across S1 remains constant at $V_{C1=Vdc}/2$ (see FIG. 3).

When the voltage across the capacitor C2 has reached the value $V_{C2}=0$, the main switch S2 is switched on in ZVS conditions. A negative voltage of VLaux2=−Vdc/4 is now present across the inductance Laux2 in the auxiliary path, leading to a negative current gradient in iaux2. When the current iaux2 has reached the value iaux2=0, the switch Saux2 can be switched off in ZCS conditions. The commutation process thus ends, and the converter path has reached the "0" state.

The following text now deals with a commutation operation 0→p where $i_0>0$.

ARCP commutation (see figure mark 4, FIGS. 3–5).

The switches S2 and S4 are closed before the start of the Commutation operation. The load current $i_o$ flows through the power semiconductor T2 and the inverse diode D4. The voltage across the respective switches S1 and S3 is $V_{C1}=V_{C3}=Vdc/2$. The inverse diodes D1 and D3 are thus reverse-biased. The switching on of the auxiliary switch Saux1 when iaux1=0 (ZCS) starts the commutation operation. owing to the positive voltage VLaux1=Vdc/4 across the auxiliary inductance Laux1, there is a positive current rise in the current iaux1. When the current iaux1 has reached a value Iboost>0 where Iboost=iaux1−$i_o$, the commutation process is started by switching the power semiconductor T4 off actively. The minimum boost current Iboost is once again governed by the oscillation-reversal condition of $V_{C1}=0$. Since the main switch S2 is switched on and the voltage across the variable-potential capacitance, containing of the series circuit formed of $C_{DC3}$ and $C_{DC4}$, is relatively constant, the difference between the load current $i_o$ and the current iaux1 commutates into the capacitors C1 and C4, which leads to the capacitor C4 being charged and the capacitor C1 being discharged. In this short commutation time, the load current is passed via T2, $C_{DC3}$ and Saux1 to the neutral point 0 of the converter.

When the voltage across C1 has reached the value $V_{C1}=0$, the main switch S1 is switched on in ZVS conditions. The voltages across the capacitors C1 and C4 are thus respectively held at $V_{C1}=0$ and $V_{C4}=Vdc/2$ (see FIG. 3). A negative voltage VLaux1=−Vdc/4 is now present across the auxiliary path, leading to a negative gradient in the current iaux1. When the current iaux1 has reached the value iaux1=0, the main switch Saux1 can be switched off in ZCS conditions. This ends the commutation process, and the converter path has reached the "p" state.

Owing to the symmetrical structure, the commutation operations for negative output currents $i_o<0$ are analogous, but the p→0 and 0→n transitions are now ARCP commutation operations, and the n→0 and 0→p transitions are capacitive and ARCP-assisted capacitive commutation operations, respectively.

To a first approximation it is irrelevant to the functioning of the ARCP principle whether the zero states "$0_+$" or "$0_-$" are chosen. The associated degree of freedom which can be utilized for charge control at the variable-potential intermediate-circuit capacitances is thus not restricted.

Hard-switching multipoint converters having variable-potential intermediate-circuit capacitances can be modified in accordance with the extensions described above to form the ARCP converter having the variable-potential intermediate-circuit capacitances. The commutation operations that are possible in these converters correspond to the three described commutation types—ARCP commutation, capacitive commutation and ARCP-assisted capacitive commutation. In general, ARCP commutation takes place in the case of commutation operations with a positive power gradient at the output, while capacitive or ARCP-assisted capacitive commutation takes place in the case of commutation operations with a negative power gradient at the output.

Since the commutation between the different output voltage levels takes place between two adjacent levels during normal operation, as a rule, moreover, only two main switches participate in the commutation. As a result, the commutation can be taken back to an original ARCP commutation cell. The variable-potential intermediate-circuit capacitances located in the ARCP commutation circuit in the ARCP multipoint converter having a variable-potential intermediate circuit do not influence ARCP commutation as long as their capacitance value is orders of magnitude greater than the capacitance value of the load-relief capacitances of the main switches. The auxiliary switch required for ARCP commutation or ARCP-assisted capacitive commutation can be correctly identified by determining the effective commutation cell for the commutation. The auxiliary path to be activated is connected between the neutral points of the two capacitance elements which form the said commutation cell and the nearest inner cell, characterized by the nearest smaller voltage across the variable-potential capacitance, and the output connection. Based on this, the correct control of the commutation operations, which involves one of the ARCP auxiliary paths, is possible in a relatively simple manner even in polyphase multipoint converters with more than 3 points.

I claim:

1. An auxiliary resonant commutated pole (ARCP) converter, comprising:
converter phases, each of said converter phases, including:
a series circuit containing at least four main switches to be connected electrically in parallel between DC voltage rails including positive and negative DC voltage rails, adjacent ones of said main switches defining junction points therebetween and one of said junction points functioning as an output of a respective converter phase;
load-relief capacitances, one of said load-relief capacitances connected electrically in parallel with each of said main switches;
two intermediate-circuit capacitances of identical magnitude to be disposed between the DC voltage rails, said two intermediate-circuit capacitances connected to each other defining a connection point being a voltage neutral point;
a variable-potential intermediate-circuit capacitance connected to said junction points of said main switches not forming said output and thus form commutation cells in a balanced manner with regard to the positive and negative DC voltage rails, said variable-potential intermediate-circuit capacitance having two capacitance elements having equivalent magnitudes and connected to each other at a junction point defining a further voltage neutral point;
a resonant inductance having a first connection connected to said output of said converter phase and a second connection; and
independently controllable bi-directional auxiliary switches connected to said voltage neutral point and said second connection of said resonant inductance.

2. An auxiliary resonant commutated pole (ARCP) multipoint converter, comprising:
converter phases, each of said converter phases, including:
a series circuit containing more than four main switches to be connected electrically in parallel between DC voltage rails including a positive and negative DC voltage rail, adjacent ones of said main switches defining junction points therebetween and one of said junction points functioning as an output of a respective converter phase;
load relief capacitances, one of said load-relief capacitances connected electrically in parallel with each of said main switches;
two intermediate-circuit capacitances of identical magnitude to be disposed between the DC voltage rails, said two intermediate-circuit capacitances connected to each other defining a connection point being a voltage neutral point;
variable-potential intermediate-circuit capacitances connected to said junction points of said main switches not forming said output of said converter phase and thus forming commutation cells in a balanced manner with regard to the positive and negative DC voltage rails, each of said variable-potential intermediate-circuit capacitance having two capacitance elements having equivalent magnitudes and connected to each other at a junction point defining a further voltage neutral point;
independently controllable bi-directional auxiliary switches, one of said independently controllable bi-directional auxiliary switches connected to said voltage neutral point of said variable-potential intermediate-circuit capacitances and another of said independently controllable bi-directional auxiliary switches connected to said further voltage neutral point of each of said variable-potential intermediate-circuit capacitances; and
resonant inductances, one of said resonant inductances connected between said output of said converter phase and one of said independently controllable bi-directional auxiliary switches, and another of said resonant inductances connected between each neighboring pair of said independently controllable bi-directional auxiliary switches such that the further voltage neutral point of respectively adjacent commutation cells are connected to one another via said independently controllable bidirectional auxiliary switches and said resonant inductances.

3. An auxiliary resonant commutated pole (ARCP) converter, comprising:
converter phases, each of said converter phases, including:
a series circuit containing at least four main switches to be connected electrically in parallel between DC voltage rails including a positive and negative DC voltage rails, adjacent ones of said main switches defining junction points there-between and one of said junction points functioning as an output of a respective converter phase;
load-relief capacitances, one of said load-relief capacitances connected electrically in parallel with each of said main switches;
at least three intermediate-circuit capacitances to be disposed between the DC voltage rails and connected to each other in series defining voltage taps therebetween at each connection, said at least three intermediate-circuit capacitances having capacitance values such that said voltage taps have voltage levels in a middle of voltage levels to be set at said output of said converter phase;

variable-potential intermediate-circuit capacitances connected to said junction points of said main switches not forming said output of said converter phase thus forming commutation cells in a balanced manner with regard to the positive and negative DC voltage rails;

independently controllable bi-directional auxiliary switches connected to said voltage taps; and a resonant inductance having a first terminal connected to said output of said converter phase and a second terminal connected to said independently controllable bi-directional auxiliary switches.

* * * * *